US010009323B2

United States Patent
Cai et al.

(10) Patent No.: US 10,009,323 B2
(45) Date of Patent: Jun. 26, 2018

(54) METHOD AND APPARATUS FOR DETECTING AND DEALING WITH A LOST ELECTRONICS DEVICE

(71) Applicant: QUALCOMM Incorporated, San Diego, CA (US)

(72) Inventors: Lukai Cai, San Diego, CA (US); Jose R Menendez, Encinitas, CA (US); Roy Benjamin Silverstein, San Diego, CA (US); Rajkrishnan Parameswaran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 15/177,139

(22) Filed: Jun. 8, 2016

(65) Prior Publication Data

US 2016/0285837 A1 Sep. 29, 2016

Related U.S. Application Data (62) Division of application No. 13/183,311, filed on Jul. 14, 2011, now Pat. No. 9,392,092.

(51) Int. Cl.
*G06F 17/30* (2006.01)
*H04L 29/06* (2006.01)
(Continued)

(52) U.S. Cl.
CPC ............ *H04L 63/0428* (2013.01); *H04L 9/14* (2013.01); *H04L 63/06* (2013.01); *H04M 1/66* (2013.01);
(Continued)

(58) Field of Classification Search
CPC .......... G06F 21/31; G06F 21/83; G06F 21/53; G06F 21/6218
(Continued)

(56) References Cited

U.S. PATENT DOCUMENTS

| 5,414,829 A | 5/1995 | Fandrich et al. |
| 7,590,837 B2 | 9/2009 | Bhansali et al. |

(Continued)

FOREIGN PATENT DOCUMENTS

| CN | 1980428 A | 6/2007 |
| CN | 101969493 A | 2/2011 |

(Continued)

OTHER PUBLICATIONS

Hu et al., "An Optimization Neural Network for Smartphone Data Protection". 2010 IEEE International Conference on Electro/Information Technology,See Abstract and p. 5 [Online] 2010.

(Continued)

*Primary Examiner* — Evans Desrosiers
(74) *Attorney, Agent, or Firm* — Kilpatrick Townsend & Stockton (57) ABSTRACT

Techniques for detecting and dealing with a lost electronics device are disclosed. In one design, the device may autonomously determine whether it is lost. The device may destroy at least one component to render it inoperable and may perform other actions in response to determining that it is lost. In another design, the device may determine available battery power of the device upon determining that it is lost, select at least one action in a list of possible actions based on the available battery power, and perform the selected action(s). In yet another design, upon determining that it is lost, the device may prevent access to information on the device based on a secondary security key, which is not used for encrypting information during normal operation. In yet another design, the device may notify at least one contact and may perform at least one additional action upon determining that it is lost.

15 Claims, 3 Drawing Sheets

(51) Int. Cl.
  *H04M 1/66* (2006.01)
  *H04M 1/725* (2006.01)
  *H04W 52/02* (2009.01)
  *H04L 9/14* (2006.01)
  *H04W 12/02* (2009.01)
  *H04N 7/16* (2011.01)

(52) U.S. Cl.
  CPC ....... *H04M 1/72577* (2013.01); *H04W 12/02* (2013.01); *H04W 52/0261* (2013.01); *H04W 52/0264* (2013.01); *H04L 2209/24* (2013.01); *Y02D 70/00* (2018.01); *Y02D 70/1222* (2018.01); *Y02D 70/1262* (2018.01); *Y02D 70/142* (2018.01); *Y02D 70/144* (2018.01); *Y02D 70/164* (2018.01)

(58) Field of Classification Search
  USPC ................. 713/155–167, 189–193; 709/229; 380/28–30, 44–47, 277–286; 726/16
  See application file for complete search history.

(56) References Cited

U.S. PATENT DOCUMENTS

| | | | |
|---|---|---|---|
| 7,809,353 B2 | 10/2010 | Brown et al. | |
| 2005/0046580 A1* | 3/2005 | Miranda-Knapp | G08B 13/1418 340/686.1 |
| 2005/0068169 A1 | 3/2005 | Copley et al. | |
| 2005/0226468 A1 | 10/2005 | Deshpande et al. | |
| 2006/0154692 A1 | 7/2006 | Ikehara et al. | |
| 2007/0266258 A1* | 11/2007 | Brown | H04L 9/0822 713/183 |
| 2008/0034224 A1 | 2/2008 | Ferren et al. | |
| 2008/0091605 A1 | 4/2008 | Hughes et al. | |
| 2008/0148350 A1 | 6/2008 | Hawkins et al. | |
| 2008/0263375 A1 | 10/2008 | Sundstrom et al. | |
| 2008/0305770 A1 | 12/2008 | Kasama | |
| 2009/0164804 A1* | 6/2009 | Mardiks | H04L 9/14 713/193 |
| 2009/0241172 A1 | 9/2009 | Sennett et al. | |
| 2009/0253410 A1* | 10/2009 | Fitzgerald | G06F 21/88 455/411 |
| 2009/0260088 A1 | 10/2009 | Quach | |
| 2009/0280826 A1 | 11/2009 | Malik et al. | |
| 2009/0313484 A1 | 12/2009 | Millet et al. | |
| 2010/0188243 A1 | 7/2010 | Tysowski et al. | |
| 2010/0190474 A1 | 7/2010 | Rajguru | |
| 2010/0210240 A1 | 8/2010 | Mahaffey et al. | |
| 2010/0240403 A1 | 9/2010 | Yu et al. | |
| 2011/0128119 A1 | 6/2011 | Rao | |
| 2011/0159931 A1 | 6/2011 | Boss et al. | |
| 2012/0075099 A1 | 3/2012 | Brown | |
| 2013/0019304 A1 | 1/2013 | Cai et al. | |
| 2016/0286389 A1 | 9/2016 | Cai et al. | |

FOREIGN PATENT DOCUMENTS

| | | |
|---|---|---|
| CN | 101990196 A | 3/2011 |
| CN | 102084369 A | 6/2011 |
| EP | 1168783 A2 | 1/2002 |
| EP | 1349049 A1 | 10/2003 |
| EP | 1793572 A2 | 6/2007 |
| JP | 2002216099 A | 8/2002 |
| JP | 2002325280 A | 11/2002 |
| JP | 2003288273 A | 10/2003 |
| JP | 2006174072 A | 6/2006 |
| JP | 2006295826 A | 10/2006 |
| JP | 2007504714 A | 3/2007 |
| JP | 2008205752 A | 9/2008 |
| JP | 2011135487 A | 7/2011 |
| KR | 200325720 Y1 | 9/2003 |
| KR | 20060067865 A | 6/2006 |
| KR | 20100104480 A | 9/2010 |
| WO | 0041058 A1 | 7/2000 |
| WO | 2004034184 A2 | 4/2004 |
| WO | 2004102823 A1 | 11/2004 |
| WO | 2005025187 A2 | 3/2005 |
| WO | 2008004120 A2 | 1/2008 |
| WO | 2010020883 A2 | 2/2010 |

OTHER PUBLICATIONS

International Search Report and Written Opinion—PCT/US2012/046808—ISA/EPO—dated Dec. 20, 2012.
OMA: "Lock and Wipe Management Object", Open Mobile Alliance, OMA-TS-LAWMO-V1_0-20101130-C, Version 1.0, Nov. 30, 2010, pp. 1-18.
Tanviruzzaman et al., "ePet: When Cellular Phone Learns to Recognize Its Owner". SafeConfig '09 Proceedings of the 2nd ACM workshop on Assurable and usable security configuration, pp. 13-17. See pp. 13, 15, and 16.[Online] 2009.
European Search Report—EP17170879—Search Authority—The Hague—dated Sep. 26, 2017.

* cited by examiner

METHOD AND APPARATUS FOR DETECTING AND DEALING WITH A LOST ELECTRONICS DEVICE

CROSS-REFERENCE TO RELATED APPLICATIONS

This application is a divisional of U.S. application Ser. No. 13/183,311, filed Jul. 14, 2011, entitled "Method and Apparatus for Detecting and Dealing With a Lost Electronics Device," which is assigned to the assignee hereof and is incorporated herein by reference.

BACKGROUND

I. Field

The present disclosure relates generally to electronics, and more specifically to techniques for dealing with a lost electronics device.

II. Background

Electronics devices such as cellular phones and smart phones are widely used for various purposes and applications. These devices often store sensitive information (e.g., personal information) of users. A device may support password-based screen lock, which can prevent the use of the device (and hence prevent unauthorized access to the sensitive information) unless a correct password is entered. However, this password-based screen lock feature is not supported by all devices. Furthermore, this password-based screen lock feature may not be utilized by users on devices that do support this feature. If password-based screen lock is not supported by a device, or is supported but not utilized, then any person who comes into contact with the device may be able to utilize the device and access the sensitive information. This may be undesirable, especially if the device is lost.

SUMMARY

Techniques for detecting and dealing with a lost electronics device are described herein. An example of a method according to the disclosure includes determining that a device is lost and preventing access to information on the device based on a secondary security key not used for encrypting the information during normal operation of the device.

Implementations of such a method may include one or more of the following features. The method may include encrypting the information based on a primary security key to secure the information prior to determining that the device is lost, and wherein the preventing access to the information comprises re-encrypting the encrypted information based on the secondary security key after determining that the device is lost. The preventing access to the information may include preventing access to the information unless the secondary security key is received by the device. The secondary security key may be inaccessible to an owner of the device and may be accessible to a trusted entity for the device.

An example of an apparatus according to the disclosure includes means for determining that a device is lost and means for preventing access to information on the device based on a secondary security key not used for encrypting the information during normal operation of the device.

Implementations of such an apparatus may include one or more of the following features. The apparatus may include means for encrypting the information based on a primary security key to secure the information prior to determining that the device is lost, and wherein the means for preventing access to the information comprises means for re-encrypting the encrypted information based on the secondary security key after determining that the device is lost. The means for preventing access to the information may include means for preventing access to the information unless the secondary security key is received by the device.

An example of an apparatus according to the disclosure includes at least one processor configured to determine that a device is lost, and to prevent access to information on the device based on a secondary security key not used for encrypting the information during normal operation of the device.

Implementations of such an apparatus may include one or more of the following features. The at least one processor may be configured to encrypt the information based on a primary security key to secure the information prior to determining that the device is lost, and to re-encrypt the encrypted information based on the secondary security key after determining that the device is lost. The at least one processor may be configured to prevent access to the information unless the secondary security key is received by the device.

An example of a computer program product according to the disclosure includes a non-transitory computer-readable medium that includes code for causing at least one computer to determine that a device is lost, and code for causing the at least one computer to prevent access to information on the device based on a secondary security key not used for encrypting the information during normal operation of the device.

Implementations of the computer program product may include one or more of the following features. The non-transitory computer-readable medium may include code for causing the at least one computer to encrypt the information based on a primary security key to secure the information prior to determining that the device is lost, and code for causing the at least one computer to re-encrypt the encrypted information based on the secondary security key after determining that the device is lost. The non-transitory computer-readable medium may include code for causing the at least one computer to prevent access to the information unless the secondary security key is received by the device.

Various aspects and features of the disclosure are described in further detail below.

DETAILED DESCRIPTION

Techniques for detecting and dealing with lost electronics devices are described herein. These techniques may be used for various types of devices such as cellular phones, smart phones, personal digital assistants (PDAs), laptop computers, tablets, netbooks, smartbooks, etc. These techniques may be used for devices that support wireless and/or wireline communication (e.g., cellular phones, smart phones, laptop computers, etc.) as well as devices that do not support communication.

A device may be used for various purposes and may store sensitive information as well as other information for an owner/user of the device. The sensitive information may include personal information, business information, etc. The sensitive information may be stored purposefully or incidentally in buffers, non-volatile memory such as Flash memory or static random access memory (SRAM), volatile memory such as random access memory (RAM), virtual memory, temporary files, etc., on the device.

The owner may lose the device and may be worried about the sensitive information stored on the device. However, the owner may have a recent back-up copy of pertinent information on the device, which may be stored on a designated server, a backup storage device, etc. Hence, the owner may not be concerned about copying information from the device onto a new device when the device is lost. The device may support a remote wipe feature and may be able to destroy the sensitive information and/or other information on the device in response to a remote wipe command from the owner. The owner may send this remote wipe command to the device when the owner realizes that the device is lost and desires to destroy the information on the device. The owner may send the remote wipe command from a remote location via a communication network supported by the device.

The remote wipe feature may not be able to guarantee destruction of information on the lost device for several reasons. First, the device may not be accessible remotely, e.g., because the device is not connected to a communication network, or a power source is removed from the device, etc. Second, the device may be tricked into giving a false response. For example, the device may be disconnected from the communication network, and the information on the device may be copied. The device may thereafter be connected to the communication network, receive a remote wipe command, wipe information on the device, and send a response indicating that the information has been destroyed. However, this response would essentially be false since the information has been copied before or after receiving the remote wipe command.

In an aspect, a device may autonomously determine that it is lost. The device may then autonomously perform one or more actions in response to determining that it is lost. The device may thus have a dead-man switch that can trigger an entire process of lock, backup, wipe, and/or self-destruct.

In general, a device may be deemed to be lost if its whereabouts is not known to an owner of the device and/or if it is not within control of the owner. For example, the device may be lost if it is misplaced by the owner, or stolen from the owner, etc. The device may determine that it is lost in various manners. This determination may not be totally accurate, and there is a possibility of the device being wrong when it determines that it is lost.

In one design, the device may determine that it is lost if it has been dropped and not picked up. The device may include an accelerometer that can sense acceleration of a fall, then a sudden stop when the device hits the floor, followed by a lack of motion. The device may also include other sensors that may sense vibration caused by the shock of a drop, deformation of the external surface of the device due to a drop, etc. The device may also detect that it has been dropped based on other sensors and/or in other manners. The device may start a timer upon detecting that it has been dropped. The device may then determine whether it has been picked up based on its sensors, or depressed keys on the device, etc. The device may declare that it is lost if it is not picked up prior to expiration of the timer. The timer may be set to a suitable value based on a tradeoff between the likelihood of correctly determining that the device is lost, how quickly lost can be detected, etc.

In another design, the device may determine that it is lost if it has not been moved for a predetermined duration. This may imply that the device has been lost, forgotten, or abandoned. The device may determine that it has not moved based on sensors on the device, or detection of the same cell or the same set of cells in a wireless network, etc.

In yet another design, the device may determine that it is lost if it is in a non-familiar environment. The device may occasionally determine its environment using various sensors on the device. The device may store a log of environments previously determined to be safe. The device may occasionally compare its current environment to the log and may declare that it is lost if the current environment deviates from the previously determined safe environments.

The environment of the device may be determined based on various sensors on the device. The environment of the device may also be determined based on one or more of the following criteria:

Location of the device, which may be determined based on a positioning method such as Global Positioning System (GPS), enhanced cell identity (ID), etc., Whether the device senses familiar devices, base stations, networks, etc. for Bluetooth, Wi-Fi, wide area network (WAN), etc., Whether the device is plugged in its usual orientation (using compass and accelerometer) or cradle, adapter, voltage, current, etc., Whether the device is plugged in at its usual location, Whether the device detects a familiar magnetic field, which may be sensed using an internal compass or by other means, Whether the device detects familiar background noise such as ambient noise, voices, music, etc., Whether the device senses familiar ambient light (e.g., lack of light may imply that the device is stuck inside a couch, or the backseat of a car, etc.), Whether the device senses familiar acceleration (e.g., the gait of the owner/user versus acceleration from being wedged in the backseat of a car), Whether the device detects familiar objects (e.g., furniture, wall color, ceiling pattern, faces, etc.), Whether applications running on the device are commonly used, Whether data being accessed on the device is commonly accessed, used, consumed, downloaded, shared, etc., Whether photos being taken by the device are of familiar areas, locations, landmarks, etc., Whether the device detects familiar touches (e.g., words per minute, left versus right hand held, hand orientation, hand size, fingertip size, etc.), Whether the device detects the voice of its owner or trusted secondary users (e g, family members, co-workers, friends, etc.), and Other criteria.

The environment of the device may be determined based on any one or any combination of the criteria listed above. The environment of the device may also be determined based on other criteria.

In one design, the device may occasionally determine its environment and may ascertain whether its environment is safe. For example, the device may ask the owner/user to confirm that it is not lost and may determine that the current environment is safe upon receiving a confirmation from the owner. In another design, the device may determine its environment whenever the device is engaged in a task deemed to be valid. A valid task may be a phone call to a number stored on the device, a function involving a valid security key or password, etc. The environment during a valid task may be deemed as safe. The device may also determine safe environments in other manners. The device may store the log of safe environments for use to detect whether the device is lost.

Figure 1:
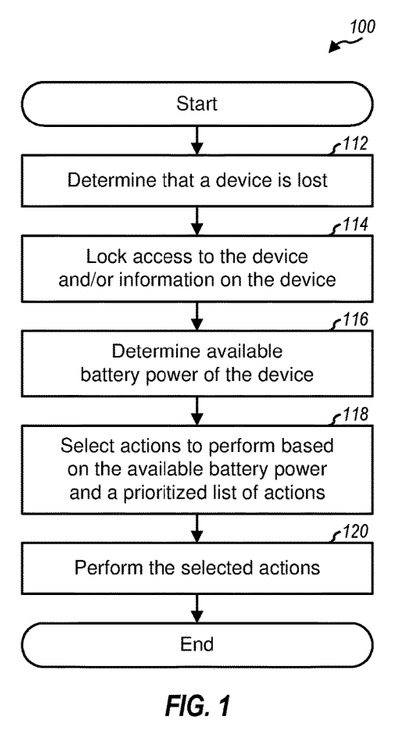
FIG. 1 shows a process for detecting and dealing with a lost device.

FIG. 1 shows a design of a process 100 performed by the device. The device may determine that it is lost (block 112). This determination may be made based on various criteria, as described above, and may have a certain likelihood of being incorrect. The device may perform various actions upon determining that it is lost. In one design, the device may lock access to the device and/or information on the device (block 114). The device may determine the available battery power of the device (block 116). The device may select actions to perform based on the available battery power and a prioritized list of actions (block 118). In general, the device may select zero, one, or multiple actions depending on the available battery power and/or other criteria. The device may perform the selected actions, if any (block 120).

In one design, the prioritized list may include one or more of the following actions:
 1. Inform a list of contacts of the device being lost,
 2. Back up information on the device,
 3. Wipe out information on the device, and
 4. Self-destruct the device.

In the design above, the actions are listed in an order from least important to most important. Hence, informing the list of contacts is the least important action in the list, and self-destruction is the most important action in the list. The prioritized list may include fewer, more, and/or different actions. The actions may also be prioritized in a different order than the order shown above.

In one design, the owner may be provided with a list of actions that can be performed by the device upon determining that the device is lost. The owner may select which actions for the device to perform and possibly the priority of each selected action. This design may allow the owner to customize which actions to perform in case the device is lost based on the owner's requirements and preferences. For example, the owner may prefer data security over device and data recoverability and may then elect to wipe out information on the device and/or self-destruct the device when it is determined to be lost. As another example, the owner may prefer device and data recoverability over data security and may then elect to secure the device and information stored on the device, but not wipe out information on the device and not self-destruct the device, when it is determined to be lost. In another design, the prioritized list of actions may be configured by a trusted entity, which may be a network operator, an enterprise information technology (IT) department, a trusted person, etc. The actions in the prioritized list may be selected from a list of possible actions.

In block 114 in FIG. 1, the device may lock and prevent access to information stored on the device upon determining that it is lost. This lock may be achieved in various manners. In one design, the device may lock access to information based on a secondary security key, which is not used to encrypt the information during normal operation. The device may encrypt sensitive information and possibly other information on the device based on a primary key to secure the information and may store the encrypted information on the device. In one design of locking information, the device may re-encrypt the encrypted information based on the secondary security key upon determining that it is lost. In this design, the information may be encrypted using two security keys when the device determines that it is lost. In another design of locking information, the device may encrypt the information on the device with only the secondary security key when the device determines that it is lost. In yet another design of locking information, the device may prevent access to the information unless the secondary security key is provided, without encrypting the information based on the secondary security key. In this design, the secondary security key may be used in similar manner as a password to access the information. The device may also lock access to information stored on the device in other manners.

In one design, the primary security key may be used by the owner of the device on a regular basis in normal operation to access information on the device. The primary security key may be configured on the device, e.g., when the device is activated or when the security key is needed. In one design, the secondary security key may be known to a trusted entity but unknown to the owner of the device. The trusted entity may be a network operator, an enterprise IT department, a trusted person, etc. In this design, the device, if found, may be taken to the trusted entity to be unlocked. In another design, the secondary security key may be known to the owner, and the device may be unlocked by the owner if it is found.

Alternatively or additionally, in block 114, the device may lock access to the device upon determining that it is lost. In one design, the device may lock the user interface of the device. For example, the device may activate screen lock in response to determining that it is lost. In another design, the device may disable certain functions of the device. In yet another design, the device may disable certain circuits on the device to render the device inoperable. The device may be unlocked by the owner, or the trusted entity, or some other entity.

In block 116 in FIG. 1, the device may determine the available battery power upon determining that it is lost. This may be achieved with a battery power detector normally available on a wireless device. The device may determine one or more actions to perform based on the available battery power.

In general, the number of actions that may be performed by the device upon determining that it is lost may be limited by the amount of available battery power of the device. The device may be able to perform more actions if more battery power is available, and vice versa. To ensure that more important actions are performed prior to less important actions, the actions that can be performed by the device may be prioritized and placed in a list. The device may then select one or more actions to perform from the prioritized list based on the available battery power.

In one design, the device may store the prioritized list of actions and may store or determine the amount of battery power required for each action. The required battery power for an action may be fixed or may be variable and dependent on one or more factors. For example, the required battery power to inform a list of contacts may be dependent on channel conditions. The required battery power to wipe out or back up information may be dependent on the amount of information to wipe out or back up. In any case, the device may know the required battery power for each action in the prioritized list. The device may traverse down the list, starting with the most important action. The device may consider one action at a time and may determine whether or not to perform the action based on the available battery power of the device and the required battery power for the action. The device may update the available battery power whenever an action is selected. The number of actions to select as well as which actions to select may be dependent on the available battery power of the device and the required battery power for each action.

For the exemplary prioritized list of four actions given above, the device may first determine whether there is sufficient battery power to self-destruct the device. If the answer is yes, then the device may select this action and may subtract the required battery power for this action from the currently available battery power of the device. Next, the device may determine whether there is sufficient battery power to wipe out information on the device. If the answer is yes, then the device may select this action and may update the currently available battery power of the device by subtracting the required battery power for this action. Next, the device may determine whether there is sufficient battery power to back up information on the device. If the answer is yes, then the device may select this action and may update the currently available battery power of the device by subtracting the required battery power for this action. Next, the device may determine whether there is sufficient battery power to notify the list of contacts. If the answer is yes, then the device may select this action.

The device may also select actions to perform based on other criteria. In one design, the device may consider the amount of time needed to complete an action. For example, a particular action (e.g., wipe) may take a long time (e.g., hours) to complete, even with a sufficient power source. The owner may be worried about security (e.g., worried that the power source will be removed from the device before the action is completed). The owner may then configure the device to skip actions that would take too long or may set maximum time limits to complete the actions before moving onto or skipping to the next step. The device may also select actions to perform based on different and/or other criteria.

The device may obtain a list of actions to perform, e.g., as described above. In general, the device may perform the actions in the list in any order. The order in which the actions are performed may be dependent on the severity of each action and whether a given action affects other actions. For example, the device may perform the self-destruct action last since this may impair the ability to perform other actions. The device may also back up information prior to wiping out the information.

In one design, for the prioritized list of four actions given above, the device may perform the actions in the reverse order of importance. For example, if there is sufficient available battery power to perform all four actions, then the device may first notify the list of contacts. The device may then back up information on the device. The device may next wipe out information on the device. The device may then self-destruct. The device may perform each of the actions as described below.

In one design, the device may store the list of contacts for possible notification when the device is lost. The list of contacts may include the owner of the device and/or other designated people or entities. The list of contacts may also include or may be associated with a database of relevant information. For example, the relevant information for a contact may include a phone number, an email address, and/or other information that may be used to notify the contact of the device being lost. The list of contacts may be configured by the owner at any time and may be configured in a secure manner.

In one design, the device may inform the list of contacts of the device being lost if there is sufficient battery power. The device may inform the contacts via short message service (SMS), email, voice call, paging, etc. The device may provide pertinent information when notifying the list of contacts. In one design, the device may provide information related to the location of the device, such as its current geographic location, or Wi-Fi location, etc. The geographic location may be determined based on GPS or some other positioning method. The Wi-Fi location may be determined based on one or more access points in a wireless local area network (WLAN) detected by the device. In another design, the device may provide information related to its environment. The environment-related information may comprise one or more photos taken by a camera on the device, a video captured by the camera, a sound clip recorded via a microphone on the device, an indication of whether the device is stationary or in motion, and/or other information captured by other sensors on the device.

A contact in the list of contacts may receive the notification of the device being lost. The contact may also receive pertinent information sent with the notification by the device. This information may be informative to the contact and/or may be used by the contact to make decisions regarding the device. In one design, the contact may be given the option of aborting subsequent actions to be performed by the device. If the contact decides to abort subsequent actions and provides a suitable response within a particular time window, then the device may skip subsequent actions.

In one design, the device may back up information on the device if there is sufficient battery power. The device may regularly connect securely to a designated server to back up information on the device. In one design, the device may back up only information that has changed since the last back-up or synchronization upon determining that it is lost. This design may reduce the amount of information to back up information when determining that the device is lost. In another design, the device may back up all designated information (e.g., all sensitive information and possibly other information). For both designs, the device may back up information in a secure manner. The device may establish a secure connection with the designated server that can back up the information. The secure connection may be achieved using encryption, or virtual private network (VPN), or bouncing data streams through various proxy servers, or other means, or a combination thereof. The device may then send the information via the secure connection for back up on the designated server.

In one design, the device may wipe/delete information on the device if there is sufficient battery power. The information to wipe may or may not match the information to back up. For example, the device may back up only pertinent information on the device but may wipe all information on the device. The information to wipe may reside in an external memory, an internal memory, a SIM card, etc. The owner may configure in advance which information, which memory, and/or which parts of which memory to wipe in case the device is lost. The device may permanently wipe information using a suitable wiping algorithm or some other means. For example, the device may use a military grade wiping algorithm (e.g., an algorithm provided by www.d-ban.org) that can overwrite every bit repeatedly in order to make the information unrecoverable.

In one design, the owner may configure in advance which parts of memory and/or which information should not be wiped. For example, a part of memory storing return information to enable return of the device to the owner may not be wiped. The return information may include a 1-800 number, an email address, or a website that a finder of the device can use to communicate with the owner in order to return the device.

In one design, the device may disable itself and self-destruct if there is sufficient battery power. In one design, the device may permanently damage certain components (e.g., all memories except for certain exempt areas) in order to render the device inoperable and physically unable to function and to make information on the device irretrievable to anyone. Components may be damaged via short-circuit, electro-magnetic pulse, blowing fuses, tampering with the battery to cause explosion, and/or other means. The device may also damage components on the device that have commercial value such as a display, a central processing unit (CPU), a graphics processing unit (GPU), etc. This may render the device inoperable and may also discourage theft of the device for resale of the entire device or its parts.

The severity of self-destruction of the device may be dependent on various factors such as the device type, the desired level of destruction, etc. For example, violent self-destruction may be allowed for a military device whereas self-destruction that does not harm anyone handling the device may be required for a consumer device. As another example, some owners may desire total self-destruction of their devices and may have no interest in recovering their devices if lost. In contrast, other owners may desire self-destruction of only certain key components of their devices, if lost, with the hope of recovering and possibly reusing their devices.

The device may determine that it is lost but too low on battery power to perform any action or all actions in the prioritized list. The device may then monitor its battery power to determine whether it has been recharged. The device may detect that is has been recharged and may interpret this event in various manners. In one design, the device may interpret battery recharge to mean that the device is not actually lost and that the prior detection of being lost was in error. The device may then move out of the "lost" state. In another design, the device may interpret battery recharge to mean possible error in the prior detection of being lost. The device may then authenticate the user before moving out of the lost state. For example, the device may require the user to enter the primary security key, a password, or some other authentication information in order to move out of the lost state. If the user cannot be authenticated (e.g., if the primary security key, password, or some other authentication information was not provided), then the device may continue with blocks 116 and 118 in FIG. 1. In yet another design, the device may maintain its determination that it is lost even after detecting battery recharge. The device may then determine the available battery power (in block 116 in FIG. 1) and perform one or more actions in the prioritized list (in block 118 in FIG. 1).

In one design, the device may include a backup power source, e.g., a backup battery. The backup power source may have sufficient power to enable the device to perform one or more actions upon determining that it is lost. For example, the backup power source may provide sufficient power to self-destruct memory and possibly other components (e.g., a CPU, a GPU, a display, etc.) beyond recovery.

The device may select actions to perform upon determining that it is lost, e.g., based on the available battery power and the priority of each action, as described above. In one design, the device may immediately perform all selected actions. In another design, the device may perform the selected actions in a staggered manner. For example, the device may immediately lock access to the device and/or information on the device upon determining that it is lost. The device may also immediately or shortly thereafter notify the list of contacts and back up information on the device. The device may then wait some amount of time before wiping out information on the device. The device may then wait some additional amount of time and then perform self-destruction. The device may immediately perform actions that do not destroy information or the device. The device may wait progressively longer for progressively more destructive actions. Alternatively, the owner may configure the device to self-destruct immediately.

In one design, the device may incorporate tamper-proof security hardware that can sense and prevent invasive tampering and/or non-invasive tampering. Invasive tampering may include opening a case, removing a power source, drilling small holes in the case to access inside, etc. Non-invasive tampering may include hyper-cooling to prevent sensing of removal of the power source, high frequency scopes to examine state of bits, etc. Tampering of the device may also be detected based on other criteria such as repeated attempts to access sensitive information, failure of certain components on the device, etc. The device may also detect whether it has been tampered via invasive or non-invasive means in other manners.

In one design, the device may determine whether it has been tampered, e.g., before or after determining that it is lost. The device may take corrective action upon detecting that it has been tampered. In one design, the device may immediately wipe out information on the device upon determining that it has been tampered. In another design, the device may immediately lock access to the device and/or information on the device upon determining that it has been tampered. The device may also perform other actions (e.g., any of the actions in the prioritized list) immediately upon detecting tampering.

FIG. 1 shows an exemplary design of detecting and dealing with a lost device. In general, one or more of the features described above may be implemented to deal with a lost device. Furthermore, the features described above may be used for other scenarios beside a lost device.

Figure 2:
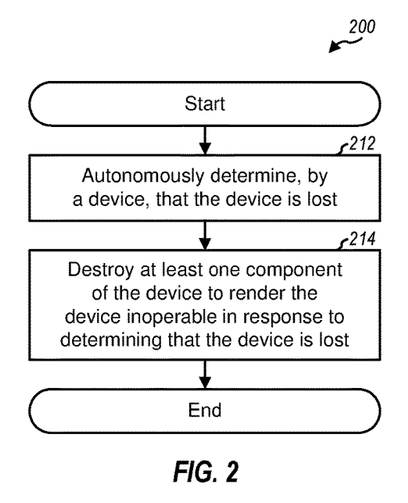
FIG. 2 shows a process for autonomously determining that a device is lost and performing one or more actions.

FIG. 2 shows a design of a process 200 performed by a device. The device may autonomously determine that it is lost (block 212). The device may destroy at least one component of the device to render the device inoperable in response to determining that the device is lost (block 214). For example, the device may destroy a memory, a CPU, a GPU, a display, and/or some other component on the device.

In one design, the device may determine that it is lost when the device is detected to have been dropped and not picked up within a predetermined time period. In another design, the device may determine that it is lost when the device is detected to have not been moved for a predetermined duration. In yet another design, the device may determine that it is lost based on the current environment of the device. The device may determine its current environment based on the location of the device, sensed results of one or more sensors on the device, one or more applications running on the device, information accessed on the device, and/or other criteria. In one design, the device may store a log of environments known to be safe for the device. The device may determine that it is lost based on the current environment of the device and the log of environments known to be safe.

In one design, the device may detect that it is tampered. The device may perform at least one action in response to detecting that it is tampered. The at least one action may include preventing access to information on the device, wiping the information on the device, preventing access to the device, etc.

Figure 3:
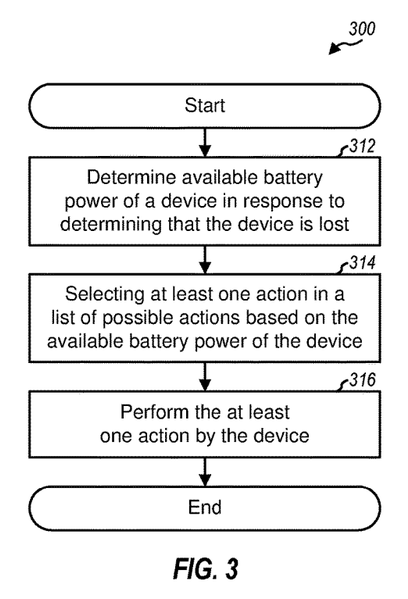
FIG. 3 shows a process for performing actions based on available battery power of a device.

FIG. 3 shows a design of a process 300 performed by a device. The device may determine available battery power of the device in response to determining that it is lost (block 312). The device may select at least one action in a list of possible actions based on the available battery power of the device (block 314). The list of possible actions may be prioritized, and the device may select the at least one action based further on the priority of each action in the list of possible actions. The device may perform the at least one action (block 316).

The device may autonomously determine that it is lost or may be notified that it is lost, e.g., by an owner via a communication link. The device may then determine the available battery power in block 312, select at least one action in block 314, and perform the at least one action in block 316 in response to determining that the device is lost. The device may prevent access to the device and/or access to information on the device in response to determining that the device is lost.

In one design, the list of possible actions may include a first action to inform a list of contacts when the device is lost, a second action to back up information on the device, a third action to wipe out information on the device, a fourth action to self-destruct the device, some other action, or a combination thereof. The list of possible actions may be specifically configured for the device, e.g., by the owner of the device or a trusted entity for the device.

The device may detect recharge of battery power of the device. In one design, the device may declare that it is not lost in response the battery recharge. In another design, the device may perform authentication to determine whether the device is actually lost. In yet another design, the device may continue to deem that it is lost even though battery power is recharged.

Figure 4:
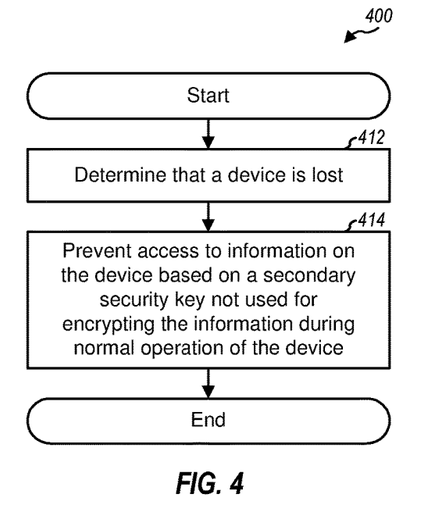
FIG. 4 shows a process for locking up information based on a security key.

FIG. 4 shows a design of a process 400 performed by a device. The device may determine that it is lost (block 412). The device may autonomously determine that it is lost or may be notified that it is lost, e.g., by an owner via a communication link. The device may prevent access to information on the device based on a secondary security key, which is not used for encrypting the information during normal operation of the device (block 414).

In one design, the device may encrypt the information based on a primary security key to secure the information prior to determining that the device is lost. The device may re-encrypt the encrypted information based on the secondary security key after determining that the device is lost. In this design, the information may be encrypted based on two security keys. In another design, the device may encrypt the information based on only the secondary security key to secure the information after determining that the device is lost. In yet another design, the device may prevent access to the information unless the secondary security key is received by the device, e.g., via a user interface on the device or remotely via a communication link. In this design, the secondary security key may be used in similar manner as a password, and the information may not be encrypted.

In one design, the secondary security key may be inaccessible to an owner of the device and accessible to a trusted entity for the device. In this design, the owner may recover the information by taking the device to the trusted entity. In another design, the secondary security key may be accessible to the owner of the device, who may be able to recover the information.

Figure 5:
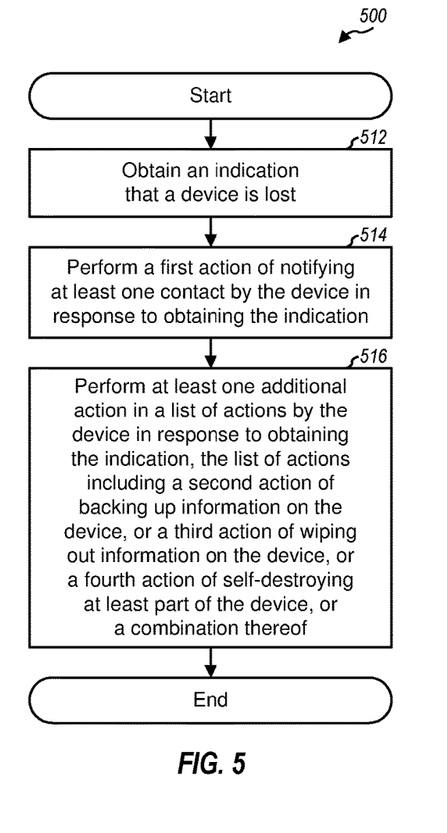
FIG. 5 shows a process for notifying contacts and performing other actions.

FIG. 5 shows a design of a process 500 performed by a device. The device may obtain an indication that it is lost (block 512). The device may perform a first action of notifying at least one contact in response to obtaining the indication (block 514). The device may perform at least one additional action in a list of actions in response to obtaining the indication (block 516). The list of actions may include a second action of backing up information on the device, a third action of wiping out information on the device, a fourth action of self-destroying at least part of the device, some other action, or a combination thereof.

The device may store a list of contacts to notify in case the device is lost and contact information for the contacts in the list. In one design, the device may notify each of the at least one contact of the device being lost. The device may also provide pertinent information such as information related to the location of the device, information related to the environment of the device, some other information, or a combination thereof. The device may receive a response from a contact among the at least one contact notified by the device. The device may skip the at least one additional action based on the response from the contact.

Figure 6:
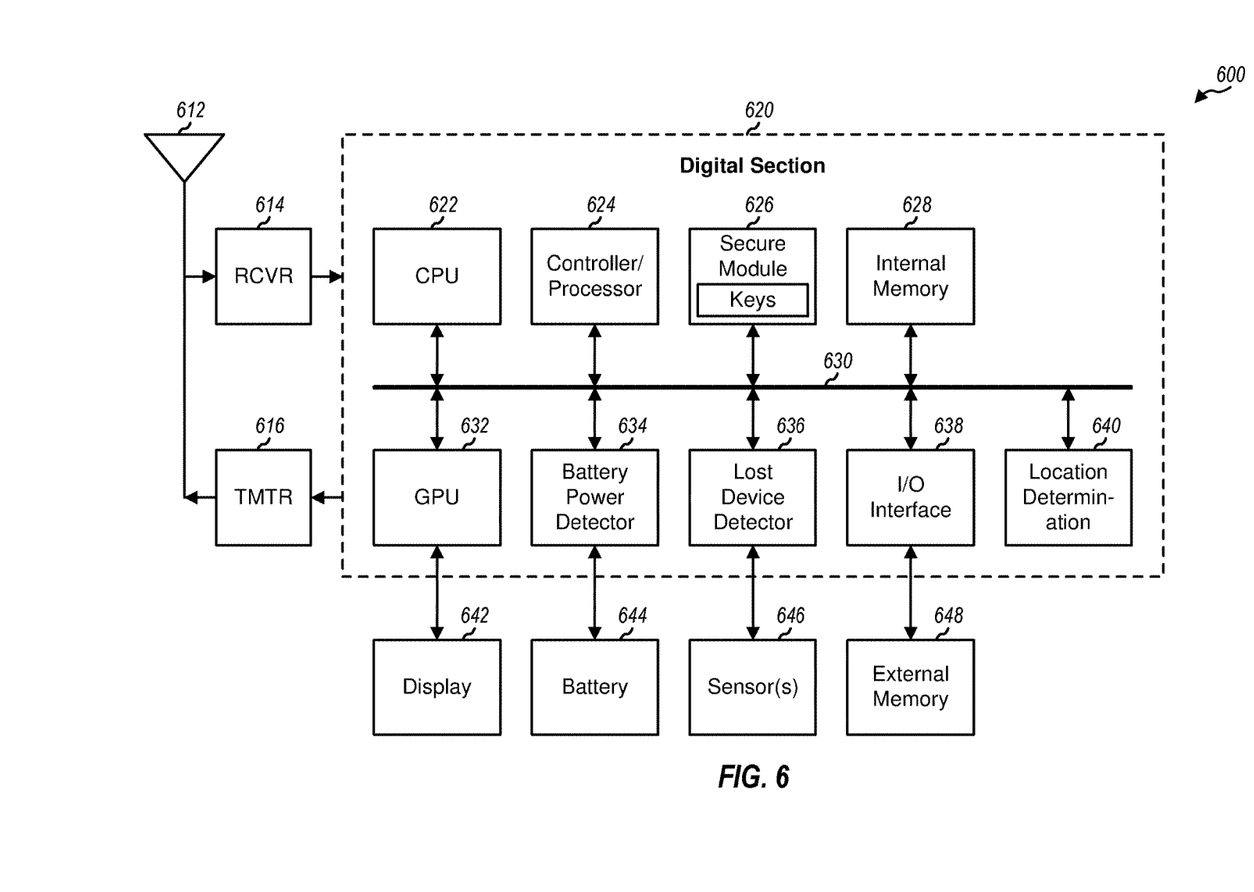
FIG. 6 shows a block diagram of a device.

FIG. 6 shows a block diagram of a design of a device 600, which may be capable of performing the techniques described herein. Device 600 may be a cellular phone, a smart phone, a PDA, a laptop computer, a tablet, a netbook, a smartbook, a terminal, a handset, etc. Device 600 may support communication via one or more wireless communication networks, which may include a Code Division Multiple Access (CDMA) network, a Global System for Mobile Communications (GSM) network, a Long Term Evolution (LTE) network, a WLAN, etc.

Device 600 can support bi-directional communication via a receive path and a transmit path. In the receive path, signals transmitted by base stations and/or other devices may be received by an antenna 612 and provided to a receiver (RCVR) 614. Receiver 614 may condition and digitize a received signal and provide input samples to a digital section 620 for further processing. In the transmit path, a transmitter (TMTR) 616 may receive data to be transmitted from digital section 620. Transmitter 616 may process and condition the data and may generate a modulated signal, which may be transmitted via antenna 612 to the base stations and/or other devices.

Digital section 620 may include various processing, interface, and memory components such as, for example, a CPU 622, a controller/processor 624, a secure module 626, an internal memory 628, a GPU 632, a battery power detector 634, a lost device detector 636, an input/output (I/O) interface module 638, and a location determination module 640, all of which may communicate via a bus 630. CPU 622 may perform processing for data transmission and reception, e.g., encoding, modulation, demodulation, decoding, etc. CPU 622 may also perform processing for various applications such as, e.g., voice call, web browsing, multi-media, games, user interface, positioning, etc. GPU 632 may perform processing for text, graphics, and video and may provide its output to a display 642. Controller/processor 624 may direct the operation of various processing and interface modules within digital section 620. Controller/processor 624, CPU 622, and/or other modules in device 600 may perform or direct process 100 in FIG. 1, process 200 in FIG. 2, process 300 in FIG. 3, process 400 in FIG. 4, process 500 in FIG. 5, and/or other processes for the techniques described herein.

Secure module 626 may securely store sensitive information, security keys, and/or other information for device 600. Memory 628 may store information and/or other data for device 600 and may comprise a RAM, a SRAM, etc. Battery power detector 634 may determine the available power of a battery 644. Although not shown in FIG. 6, device 600 may include a backup power source (e.g., a backup battery), which may ensure sufficient battery power to perform one or more actions when device 600 is determined to be lost. Lost device detector 636 may receive the outputs of one or more sensors 646, determine the environment of device 600, determine whether device 600 is lost, etc. I/O interface module 638 may facilitate transfer of data between digital section 620 and an external memory 648. Memory 648 may comprise a RAM, a SRAM, a dynamic RAM (DRAM), a synchronous DRAM (SDRAM), a Flash memory, etc. Module 640 may determine the location of device 600 based on measurements of satellites, base stations, and/or other transmitter stations.

Digital section 620 may be implemented with one or more digital signal processors (DSPs), micro-processors, reduced instruction set computers (RISCs), etc. Digital section 620 may also be implemented on one or more application specific integrated circuits (ASICs) or some other type of integrated circuits (ICs).

The techniques described herein may provide various advantages. A device may autonomously determine whether it is lost. The device may be able to do this by itself without having to be connected to a communication network and without having to be informed by the owner or some other entity. The device may autonomously perform one or more actions, also by itself, with little or no input from the owner or some other entity. The device may secure itself and information stored on the device against access, back up information to a designated server, destroy information on the device, and/or perform other actions. The device may select which actions to perform based on the priorities of the actions and the available battery power of the device, so that more important actions can be performed when there is insufficient battery power to perform all actions.

The techniques described herein may provide better security than a remote wipe request, which may be sent by an owner to a device upon the owner determining that the device is lost. The techniques do not require a connection to a communication network in order to secure and/or destroy information on a device. The techniques may also provide a measure of security for users who do not want to deal with the constant hassle of unlocking their devices with a password. The techniques may be especially applicable for portable electronics devices such as smart phones, tablets, etc. These portable electronics devices may have computer-like capabilities but may be more portable and easier to lose in a variety of locations than computers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a DSP, an ASIC, a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   encrypting, at a device, a first portion of information on the device based on a primary private security key;
   autonomously determining, by the device, that the device is lost; and in response to determining that the device is lost, preventing, at the device, access to the information on the device, the preventing access to the information comprising:
   encrypting the encrypted first portion of the information and a second portion of the information based on a secondary private security key not used for encrypting the information during normal operation of the device, such that the first portion of the information on the device becomes encrypted based on the secondary private security key and encrypted based on the primary private security key; wherein the secondary private security key is inaccessible to an owner of the device and is accessible to a trusted entity for the device.

2. The method of claim 1, wherein the primary private security key is used for encrypting the first portion of the information during normal operation of the device.

3. The method of claim 1, wherein the preventing access to the information further comprises allowing access to the information when the secondary private security key is received by the device.

4. The method of claim 1, further comprising: disabling one or more components of the device to render the device inoperable
   responsive to determining that the device is lost.

5. The method of claim 1, wherein autonomously determining that the device is lost comprises:
   detecting a sequence of states of motion of the device; and
   determining that the device is lost based on the detected sequence.

6. The method of claim 1, wherein autonomously determining that the device is lost comprises:
   obtaining, from one or more sensors, information indicating an environment in which the device is located; and
   determining that the device is lost based on the information.

7. An apparatus comprising:
   means for encrypting, at a device, a first portion of information on the device based on a primary private security key,
   means for autonomously determining, by the device, that the device is lost; and means for preventing access to the information on the device in response to determining that the device is lost, wherein the means for preventing access to the information comprises:
   means for encrypting the encrypted first portion of the information and a second portion of the information based on a secondary private security key not used for encrypting the information during normal operation of the device, such that the first portion of the information on the device becomes encrypted based on the secondary private security key and based on the primary private security key; wherein the secondary private security key is inaccessible to an owner of the device and is accessible to a trusted entity for the device.

8. The apparatus of claim 7, wherein the primary private security key is used for encrypting the first portion of the information during normal operation of the device.

9. The apparatus of claim 7, wherein the means for preventing access to the information further comprises means for allowing access to the information when the secondary private security key is received by the device.

10. An apparatus comprising:
    at least one processor configured to:
    encrypt a first portion of information on the apparatus based on a primary private security key;
    determine that the apparatus is lost; and
    in response to determining that the apparatus is lost, prevent access to the information on the apparatus, the prevent access to the information comprising:
    encrypt the encrypted first portion of the information and a second portion of the information based on a secondary private security key not used for encrypting the information during normal
    operation of the apparatus, such that the first portion of the information on the apparatus becomes encrypted based on the secondary private security key and based on the primary private security key; wherein the secondary private security key is inaccessible to an owner of the device and is accessible to a trusted entity for the device.

11. The apparatus of claim 10, wherein the primary private security key is used for encrypting the first portion of the information during normal operation of the apparatus.

12. The apparatus of claim 10, wherein the preventing access to the information further comprises allowing access to the information when the secondary private security key is received by the apparatus.

13. A computer program product, comprising:
    a non-transitory computer-readable medium comprising:
    code for causing at least one computer to encrypt a first portion of information on a device based on a primary private security key;
    code for causing the at least one computer to determine that the device is lost; and
    code for causing the at least one computer to prevent access to the information on the device in response to determining that the device is lost, wherein the code for preventing access to the information comprises:
    code for encrypting the encrypted first portion of the information and the second portion of the information based on a secondary private security key not used for encrypting the information during normal operation of the device, such that the first portion of the information on the device becomes encrypted based on the secondary private security key and based on the primary private security key; wherein the secondary private security key is inaccessible to an owner of the device and is accessible to a trusted entity for the device.

14. The computer program product of claim 13, wherein the primary private security key is used for encrypting the first portion of the information during normal operation of the device.

15. The computer program product of claim 13, wherein the code for causing the at least one computer to prevent access to the information further comprises code for causing the at least one computer to allow access to the information when the secondary private security key is received by the device.

* * * * *